United States Patent [19]

Gentes et al.

[11] Patent Number: 5,481,762
[45] Date of Patent: Jan. 9, 1996

[54] HELMET HAVING A PLANAR-MOLDED INFRASTRUCTURE

[75] Inventors: James J. Gentes, Soquel; Steven K. Sasaki, Santa Cruz, both of Calif.

[73] Assignee: Giro Sport Design, Inc., Santa Cruz, Calif.

[21] Appl. No.: 301,696

[22] Filed: Jan. 25, 1989

[51] Int. Cl.$^6$ .................................................. A42B 3/04
[52] U.S. Cl. ................................ 2/411; 2/412; 2/425
[58] Field of Search ............................ 2/410, 411, 412, 2/414, 425, 180, 192, 260, 261, 264

[56] References Cited

U.S. PATENT DOCUMENTS

| | | | |
|---|---|---|---|
| 1,997,187 | 4/1935 | Taylor | 2/411 |
| 2,926,356 | 3/1960 | Taylor | 2/412 |
| 3,082,485 | 3/1963 | Thomas | 264/255 X |
| 3,351,689 | 11/1967 | Bushcott et al. | 264/255 X |
| 3,425,061 | 2/1969 | Webb | 2/414 |
| 3,467,964 | 9/1969 | Hannan | 2/410 |
| 4,134,155 | 1/1979 | Robertson | 2/412 |
| 4,307,471 | 12/1981 | Lovell | 2/425 X |
| 4,443,891 | 4/1984 | Blomgren et al. | 2/414 |
| 4,466,138 | 8/1984 | Gessalin | 2/192 |
| 4,710,984 | 12/1987 | Asper et al. | 2/412 |
| 4,766,616 | 8/1988 | Donahue | 2/422 |
| 4,903,348 | 2/1990 | Broersma | 2/425 X |
| 5,088,130 | 2/1992 | Chiarella | 2/411 |
| 5,099,523 | 3/1992 | Broersma | 2/411 |
| 5,119,516 | 6/1992 | Broersma | 2/411 |

FOREIGN PATENT DOCUMENTS

| | | | |
|---|---|---|---|
| 96148 | 12/1983 | European Pat. Off. | 2/411 |
| 2241267 | 3/1975 | France | 2/410 |
| 2294659 | 8/1976 | France | 2/414 |
| 2335168 | 7/1977 | France | 2/411 |
| 2340066 | 10/1977 | France | 2/412 |
| 3632525 | 3/1988 | Germany | 2/410 |

Primary Examiner—C. D. Crowder
Assistant Examiner—Michael A. Neas
Attorney, Agent, or Firm—Limbach & Limbach; George C. Limbach

[57] ABSTRACT

An injection molded foam bicycle helmet is disclosed and is constructed from a dome-shaped internal frame and a surrounding coating of a foam based material. The dome-shaped frame is formed from an integrally molded, planar member including an annular lower perimeter body, at least one lateral arc-shaped rib extending from one side of the body to the opposite side of the body, and at least one longitudinal arc-shaped rib extending from the front of the body to the rear of the body. Both the lateral and longitudinal ribs deform out of the plane of the body and into arched configurations, thereby forming the dome-shaped frame. Each lateral rib is also operative to engage each of the longitudinal ribs so as to provide additional structural support for the frame. A number of positioning pins are also formed along the inwardly and outwardly facing sides of the body and the ribs for centrally positioning the frame within the mold.

42 Claims, 5 Drawing Sheets

HELMET HAVING A PLANAR-MOLDED INFRASTRUCTURE

BACKGROUND OF THE INVENTION

1. Field of the Invention

The present invention relates generally to foam injection molded bicycle helmets, and more specifically to a method for making a bicycle helmet having a novel planar-molded infrastructure about which the helmet is formed.

2. Brief Description of the Prior Art

Foam molded bicycle helmets were first introduced on the market by Applicant in 1985. These helmets were not only light-weight and stylishly designed, but also offered surprisingly effective protection to bicycle riders against head injuries. It was found that by injection molding the shell of the helmet out of foam, injected at a density of about 5½ pounds per cubic foot, a rigid, light-weight helmet could be formed that was capable of meeting and exceeding all applicable safety standards for such helmets. These helmets, weighing approximately 6 ounces, were not only found to protect riders involved in high range collisions (i.e., a 50–60 mile per hour collision with a wall), but also those involved in low range collisions (i.e., falls from 4–5 feet from the ground).

Shortly after these helmets appeared on the market, a number of copies of the helmets began to surface. These helmets, unlike the originally designed helmets, were of lower quality and experienced a difficult time passing safety standards. A number of these helmets were found to fracture upon impact and break into two or more pieces, thereby proving to be completely ineffective or increasing the possibility for further injury in the event the rider's head bounced after initial impact. Even Applicant's helmets were found to experience some problem with breakage when subject to extremely high end collisions or particularly bizarre accidents.

To resolve this problem, different manufactures have tried a number of different solutions. Some manufacturers, who had previously been using fabric caps stretched over the helmet as a stylish indicator of origin, attempted to use the caps to help keep the helmets together. Fabric caps have proven to be ineffective for this purpose. Other manufacturers have attempted to wrap tape or other reinforcing material around a portion of the lower perimeter of the helmet. This solution has not been generally effective because only a small portion of the overall helmet has been protected. Finally, some manufactures have even imbedded strips of a fish-net like material into the helmet itself. While the netting protects a larger portion of the overall helmet, it is difficult to imbed the netting within the helmet during the manufacturing process, the netting still does not protect the entire helmet or provide sufficient structural stability, and it can cause unsightly deformations in the surface of the helmet.

Even the smallest decrease in weight of equipment worn by professional bicycle riders can result in a significant change in the amount of time required to race a certain distance. In addition, improved equipment aerodynamics can also have a significant impact on a rider's time. Hence, a number of helmets have been developed which have air passages formed in the surface of the helmet to improve aerodynamics, reduce weight, and provide air conditioning to the rider's head. A non-reinforced helmet can only have a small quantity of the helmet's total area dedicated to air passages for it to be able to maintain integrity upon impact. The netting or other materials used to reinforce some helmets can also restrict the quantity and area of the helmet which can be dedicated to air passages because some materials obstruct the passages and other materials become weakened when cut to produce passages. Thus, another type of reinforcement is needed to solve the problems associated with producing a truly light-weight, aerodynamic bicycle safety helmet.

SUMMARY OF THE PRESENT INVENTION

It is therefore an object of the present invention to provide a novel injection molded bicycle helmet having an increased ability to maintain integrity upon impact.

Another object of the present invention is to provide a novel, light-weight, frame for use as the infrastructure of an injection molded bicycle helmet which can be easily incorporated into use with an injection mold.

Another object of the present invention is to provide for a novel, reinforced foam helmet having a lower foam density than standard non-reinforced foam helmets.

Still another object of the present invention is to provide a novel three-dimensional frame for use as the infrastructure of an injection molded bicycle helmet which can be formed from an integral, planar-molded piece of plastic.

A still further object of the present invention is to provide a novel three-dimensional infrastructure for use in a foam helmet which allows for the formation of a plurality of unobstructed air passages through the surface of the helmet.

Briefly a preferred embodiment of the present invention comprises an injection molded foam bicycle helmet comprising a dome-shaped internal frame and a surrounding coating of a foam based material. The dome-shaped frame is formed from an integrally molded, planar member including an annular lower perimeter body, at least one lateral arc-shaped rib extending from one side of the body to the opposite side of the body, and at least one longitudinal arc-shaped rib extending from the front of the body to the rear of the body. Both the lateral and longitudinal ribs are deformable out of the plane of the body and into arched configurations, thereby forming the dome-shaped frame. Each lateral rib is also operative to engage each of the longitudinal ribs so as to provide additional structural support for the frame. A number of positioning pins are also formed along the inwardly and outwardly facing sides of the body and the ribs for centrally positioning the frame within the mold.

These and other objects of the present invention will no doubt become apparent to those skilled in the art after having read the following detailed disclosure of a preferred embodiment which is illustrated in the several figures of the drawing.

DESCRIPTION OF THE PREFERRED EMBODIMENT

Figure 1:
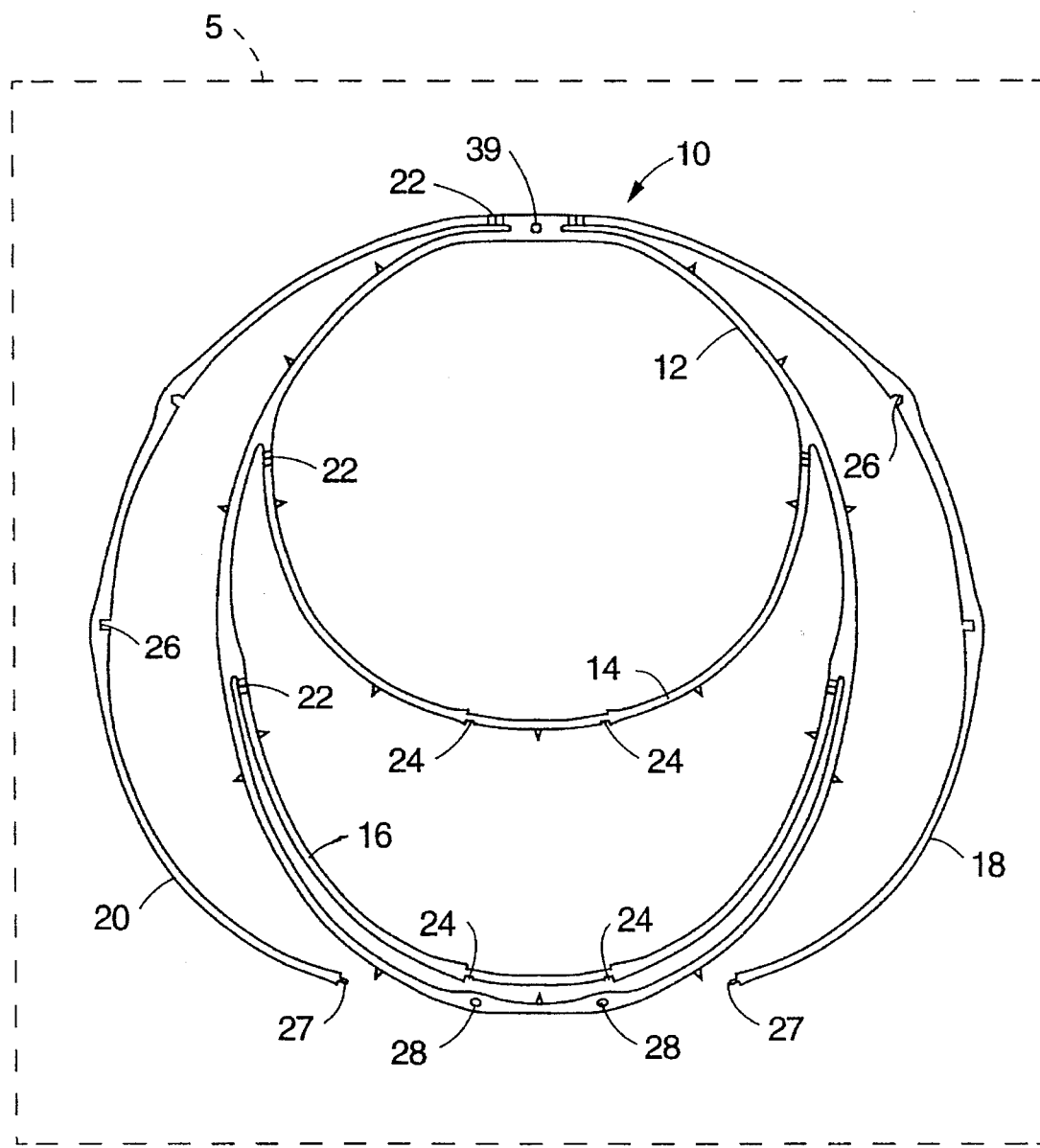
FIG. 1 is a plan view of an integral, planar-molded, frame forming member in accordance with the preferred embodiment of the present invention.

Referring now to FIG. 1 of the drawing, there is shown a plan view of an integral, planar-molded frame forming member 10. Member 10 is injection molded out of plastic into a generally spider-shaped configuration having an annular body 12, an arc-shaped first lateral cross member or rib 14, an arc-shaped second lateral rib 16, an arc-shaped first longitudinal rib 18, and an arc-shaped second longitudinal rib 20. Each of the ribs 14, 16, 18 and 20 are integrally joined to the body 12 by hinges 22 and are deformable out of the plane 5 in such a manner so as to form a dome-shaped frame about which the helmet can be formed.

Figure 2:
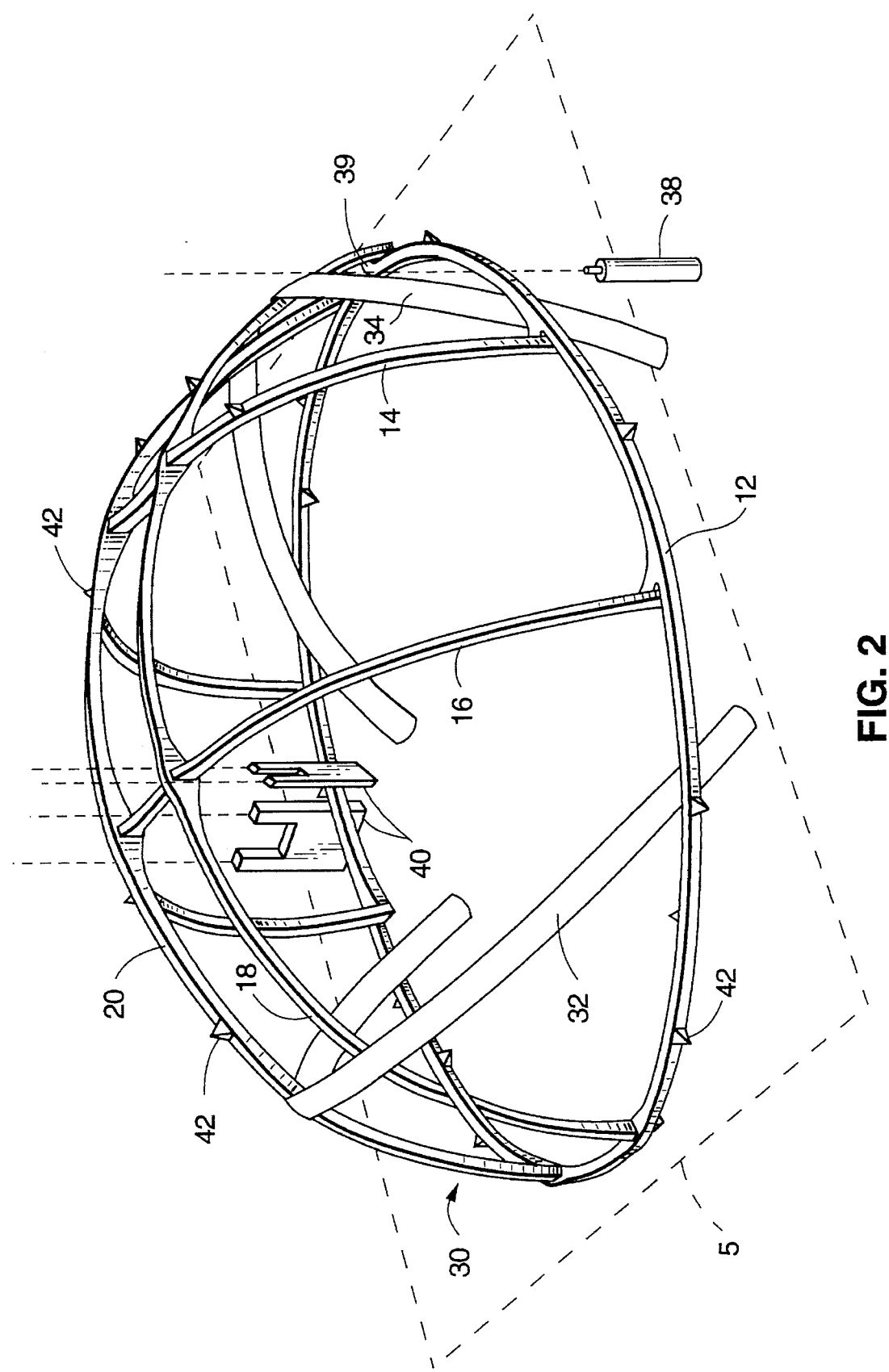
FIG. 2 is perspective view of the member illustrated in FIG. 1 after deformation into a dome-shaped frame in accordance with the preferred embodiment of the present invention.

Ribs 14 and 16 have at least two integrally formed fasteners 24 in the outer perimeter or its arc-shaped mold. These fasteners 24 are generally located toward the apex of the arc. Likewise, ribs 18 and 20 have corresponding integrally formed fasteners 26 in the inner perimeter of its arc-shaped mold. When the ribs of planar-molded member 10 are deformed from the plane 5 of the member, they create arched configurations, which can then be coupled together by the fasteners 24 and 26 to from a dome-shaped frame 30, as shown in FIG. 2. Whereas, ribs 14 and 16 are integrally hinged to body 12 by hinges 22 at either end, ribs 18 and 20 are only integrally hinged at one end by hinges 22. Hence, to firmly attach ribs 18 and 20 to body 12, tips 27 of ribs 18 and 20 are inserted into holes 28.

It should be noted that member 10 can be suitably molded in a number of different patterns or configurations in accordance with the present invention. At the very least, member 10 should have an annular perimeter body 12 and one arc-shaped rib, either integrally hinged to the body 12 at one end and deformable out of the plane 5 of the body 12 into an arched configuration, or separately molded and attachable to body 12 so as to form an arch. This rib could be Y-shaped or any of a number of different shapes. Likewise, any number of additional ribs could be added to the most basic structure of the member 10 so as to form a variety of differently configured frames 30. For simplicity purposes, only the preferred embodiment of the present invention is detailed in the several figures of the drawing.

The planar design of the member 10 has a number of distinct advantages over similarly constructed three-dimensional structures. Since the planar-molded member 10 is molded primarily flat, the tooling required to create member 10 is less expensive than the tooling that would be required to create a three-dimensional frame. Since it is less expensive to create the necessary tooling, a number of different shapes and sizes of members 10 can be created for different helmets with the same amount of money required to create a single frame for one size of helmet. In addition, planar pieces require less storage and shipping space than do bulkier three-dimensional frames.

Referring now to FIG. 2., there is shown a dome-shaped frame 30, formed out of member 10 by the deformation of ribs 14, 16, 18, and 20 into four crisscrossing arched configurations. As previously stated, the ribs are held in place by the coupling of fasteners 24 and 26. By looping front strap 32 over a front portion of either or both ribs 18 and 20 prior to molding the helmet, front strap 32 can be firmly secured within the helmet. Likewise, rear strap 34 can be looped over a rear portion of either or both ribs 18 and 20 prior to molding the helmet in order to secure that strap.

FIG. 2 also illustrates the manner in which frame 30 is supported with the mold during the injection molding process. A rear support pin 38, insertable through pin hole 39 (better shown in FIG. 1), is used to support the rear portion of the frame 30. To support the remainder of the frame, two elongated U-shaped pins 40 are positioned across any two of the crossing joints formed by the crisscrossing ribs. In FIG. 2, pins 40 are positioned across the joints formed by the perpendicular crossing of rib 16 with rib 18 and the perpendicular crossing of rib 16 with rib 20. The pins 38 and 40 can be made to be removed after the helmet has been formed or to be retained within the helmet after molding. In either case, these pins would generally be of a light-weight plastic construction capable of maintaining their form during the injection process. In addition to pins 38 and 40, small positioning pins or points 42 can be integrally formed along the sides of the body 12 and ribs 14, 16, 18 and 20. The points 42 centrally position the frame 30 within the injection mold. The ends of points 42 taper off and are therefore virtually undetectable after the helmet has been molded.

Figure 3:
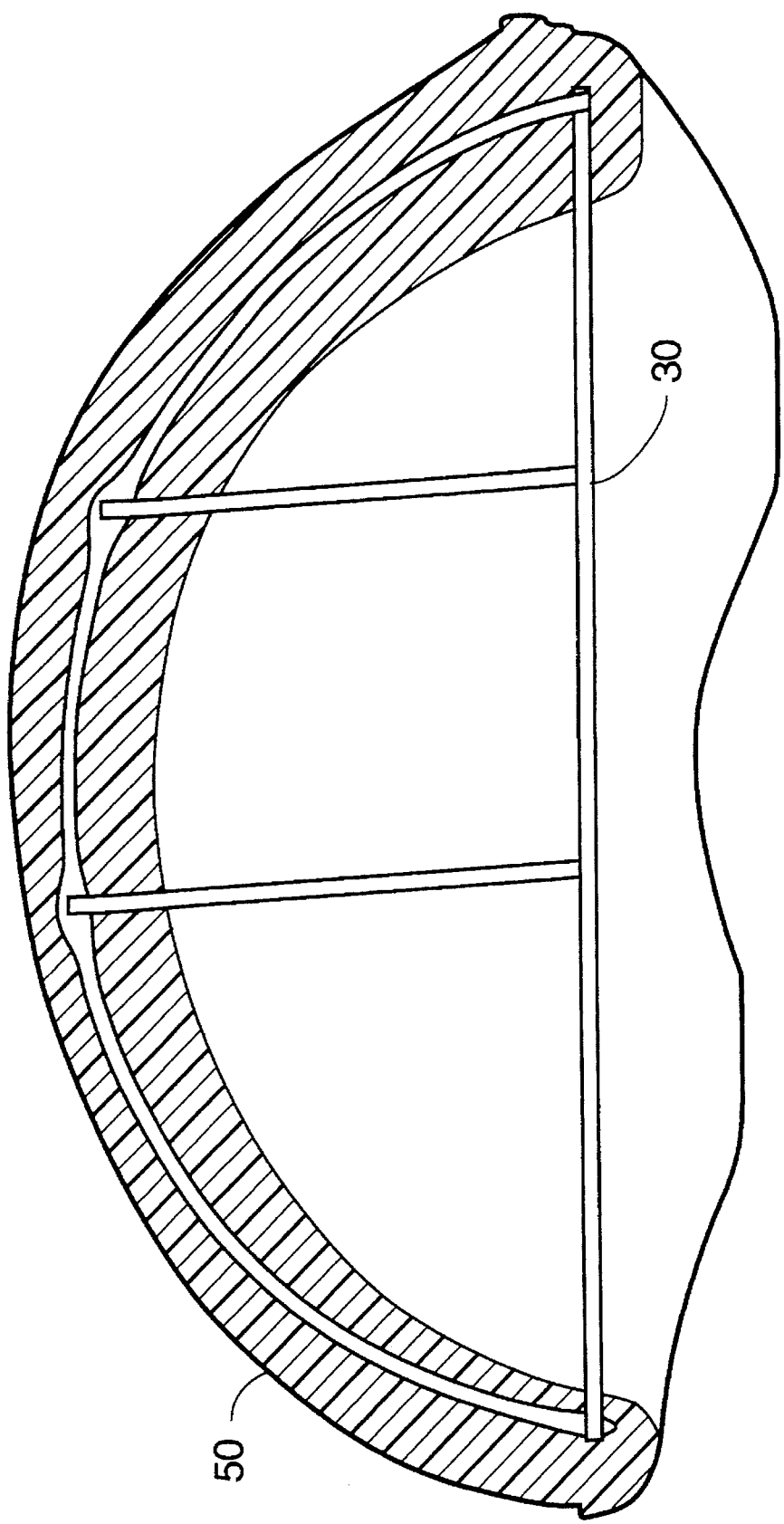
FIG. 3 is a partially-broken, side elevational view of a foam helmet having the domed-shaped frame of FIG. 2 embedded therein.

FIG. 3 illustrates a partially-broken, side elevational view of a foam helmet 50 having the domed-shaped frame 30 centrally embedded therein. In FIG. 3, the frame 30 is shown in its basic three-dimensional form, while the foam portion of the helmet is shown as a partially-broken cross-section taken along the longitude of the helmet 50.

Figure 4:
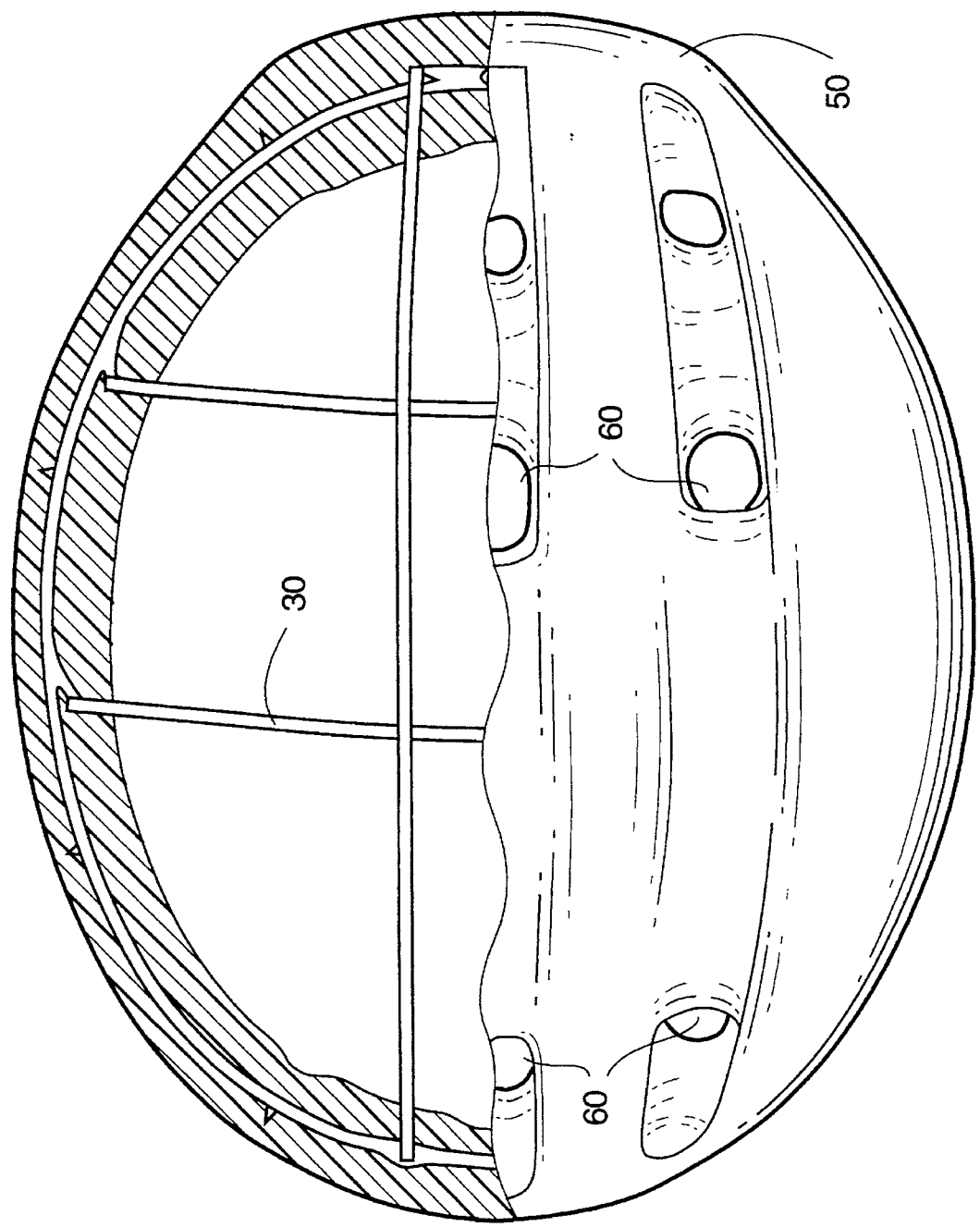
FIG. 4 is a partially-broken, plan view of a helmet formed in accordance with the preferred embodiment of the present invention.

FIG. 4 illustrates a partially-broken, plan view of helmet 50 which further illustrates the central positioning of frame 30 within helmet 50. In addition, FIG. 4 illustrates a number of the air passages 60 which can be formed within helmet 50 without reducing the helmet's ability to maintain its integrity upon impact in a collision.

Figure 5:
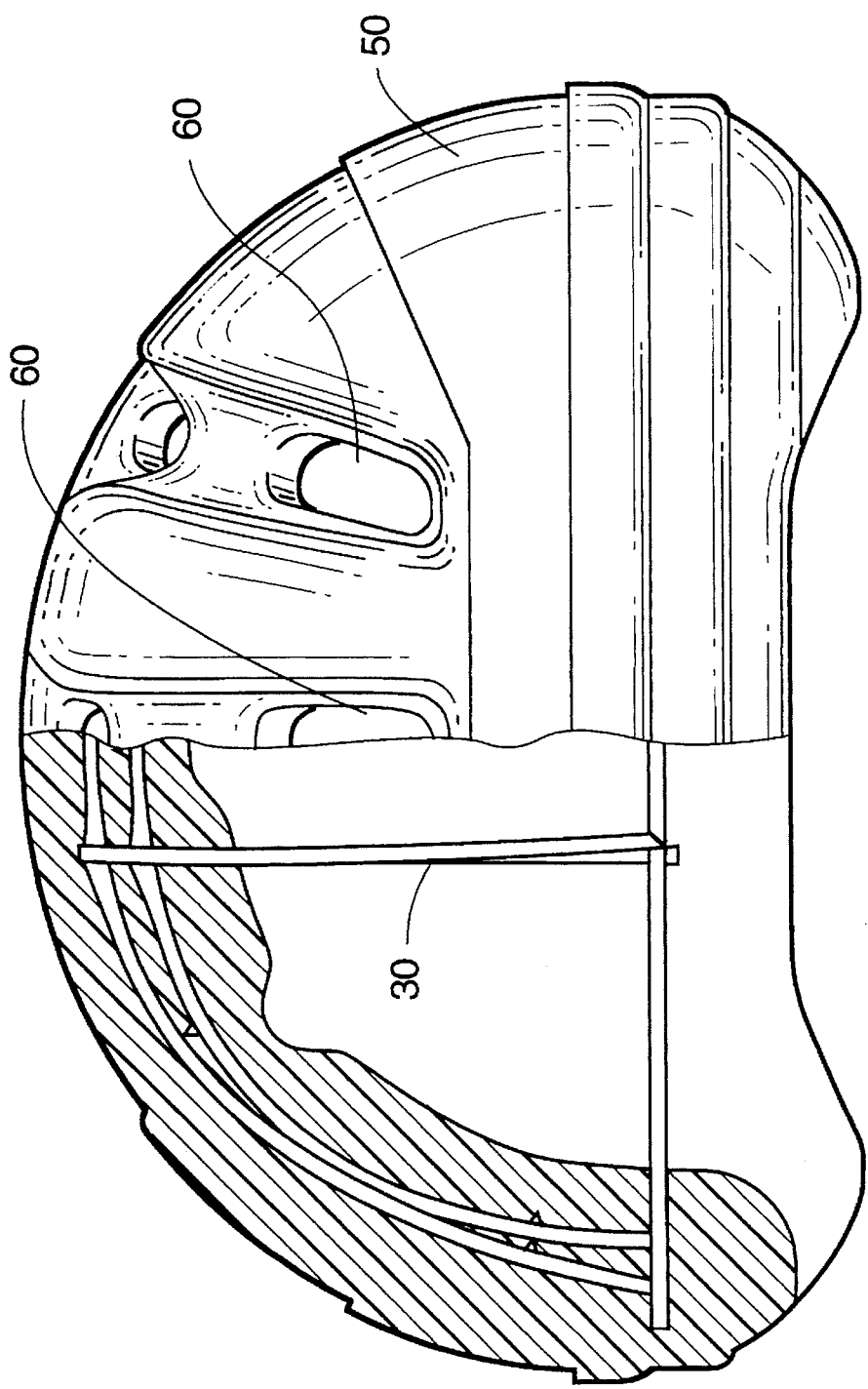
FIG. 5 is a partially-broken, rear elevational view of the helmet of FIG. 4.

FIG. 5 is a partially-broken, rear elevational view of the helmet of FIG. 4, which further illustrates the positioning of frame 30 within helmet 50 and the location of air passages 60 within the molded helmet. Through use of the frame 30 as an infrastructure about which the helmet 50 can be formed, it is possible to use larger air passages 60, as well as more air passages, without significantly reducing the helmets ability to maintain its integrity upon impact. Since the helmet will maintain its own integrity, there is no longer any need for the stretchable caps which are often fit over the helmets, thereby reducing the weight of the helmets.

In addition to the above, the framing within the helmet allows for the helmet to be formed from a lower density of foam than is possible with standard non-reinforced helmets. In standard helmets, a density of about 5½ pounds per cubic foot is required in order for the helmet to achieve a desired rigidity. However, this rigidity causes the helmets to offer a lower degree of protection on low end collisions than may be desired, although the helmets offer greater high end protection than softer helmets. Since most collisions occur on the lower end, a softer helmet is desirable. With use of the frame 30, the helmet can be molded using a foam density of only about 3½ pounds per cubic foot, thereby creating a softer helmet. This reduction in foam density also reduces the over weight of the helmets from about 6 ounces to about 3 ounces; a significant reduction in weight.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An injection molded helmet, comprising:
   a generally dome-shaped frame including a generally annular body and an integrally formed generally arced first rib extending between at least two points on said body; and
   an injection molded material substantially formed about said frame so as to form said helmet.

2. An injection molded helmet as recited in claim 1, wherein said frame further includes an integrally formed generally arced second rib extending between at least two points on said body.

3. An injection molded helmet as recited in claim 2, wherein said frame is integrally formed from a planar-molded member, and wherein said first and second ribs are deformed out of the plane of said member to form arched configurations.

4. An injection molded helmet as recited in claim 3, wherein said first rib is deformed out of the plane of said member into crossing relationship with said second rib.

5. An injection molded helmet as recited in claim 1, wherein said frame further includes a plurality of positioning pins projecting from said body and said first rib, said pins being operative to position said frame within an injection mold prior to forming said injection molding material about said frame.

6. An injection molded helmet as recited in claim 1 wherein said frame is integrally formed from a planar-molded member, and wherein said first rib is deformed out of the plane of the planar-molded member into a first position, said first position disposed to accommodate at least one area within said helmet through which a plurality of unobstructed air passages may be formed during injection molding.

7. An injection molded helmet as recited in claim 2 wherein said frame is integrally formed from a planar-molded member, and wherein said first rib is deformed out of the plane of the planar-molded member into crossing relationship with said second rib.

8. An injection molded helmet as recited in claim 1, wherein said frame is integrally formed from a planar-molded member, and wherein said first rib is deformed out of the plane of said member to form an arched configuration.

9. An injection molded helmet as recited in claim 1, wherein said frame further includes a plurality of positioning pins projecting from said body and said first rib and operative to position said frame within an injection mold.

10. An injection molded helmet as recited in claim 1, wherein said body defines a reference plane, and wherein said first rib is deformable out of said plane into a position within said helmet to create at least one area within said helmet through which a plurality of unobstructed air passages may be formed.

11. A molded frame member for providing structural integrity to a molded plastic bicycle rider's helmet, comprising:
    a generally annular body portion defining a reference plane;
    a generally arced first rib portion having at least one end integrally hinged to said body; and
    a generally arced second rib portion having at least one end integrally hinged to said body,
    said first and second rib portions being deformable out of said plane relative to said body portion into parallel planes which are substantially perpendicular to said plane relative to said body portion to form a generally dome-shaped frame.

12. A molded framing member as recited in claim 11, and further comprising a generally arced third rib portion having at least one end integrally hinged to said body portion, said third rib portion being deformable out of said plane relative to said body portion into crossing relationship with said first and second rib portions at at least one crossing point.

13. A molded framing member as recited in claim 12, wherein said third rib portion is deformable out of said plane relative to said body portion into crossing relationship with said first and second rib portions at an angle substantially perpendicular to the orientation of said first and second rib portions.

14. A molded framing member as recited in claim 12, and further comprising a generally arced fourth rib portion having at least one end integrally hinged to said body portion, said fourth rib portion being deformable out of said plane relative to said body portion into a position substantially parallel to said third rib portion.

15. A molded framing member as recited in claim 14, wherein said third and fourth rib portions are deformable out of said plane relative to said body portion into crossing relationship with said first and second rib portions at an angle substantially perpendicular to the orientation of said first and second rib portions.

16. In a helmet, the combination comprising:
    a) a helmet body consisting of gas expanded synthetic resin, and having dome shaped extent and defining a lower edge extending generally in a loop, said body subject to cracking under high impact loading,
    b) a separate and first elongated reinforcement member encapsulated in the helmet body to extend throughout its length above said lower edge and substantially entirely around the helmet body and between inner and outer walls defined by said body, and at least one additional elongated reinforcement member having lower ends connected to said first member and arching upwardly and encapsulated within said dome-shaped extent of the helmet, said members being formed from a material having a composition different from that of said body to reinforce said body.

17. The combination of claim 16 wherein said first elongated reinforcement member has band shape, the first elongated reinforcement member oriented to have a lower edge projecting toward the helmet lower edge.

18. The combination of claim 16 including a fabric cover fitting over the body and retained to the body proximate the lower edge thereof.

19. In a helmet, the combination comprising:
    a) a molded helmet body consisting of gas expanded synthetic resin, and having dome shape defining a lower edge extending generally in a loop, said body subject to cracking under high impact loading,
    b) a separate and first elongated reinforcement member molded into and thereby encapsulated in the helmet body to extend above said lower edge, and at least one additional elongated reinforcement member having lower ends connected to said first member at opposite sides thereof and arching upwardly and embedding within said dome-shaped extent of the helmet, said member being formed from a material having a composition different from that of said body to reinforce said body, c) said first member having band shape, and first member oriented to have a lower edge projecting toward the helmet lower edge, d) the first member being a ring which consists of high strength synthetic resin.

20. In a helmet, the combination comprising:

a) a molded helmet body consisting of gas expanded synthetic resin, and having dome shape defining a lower edge extending generally in a loop, said body subject to cracking under high impact loading, b) a separate elongated reinforcement member molded into and thereby encapsulated in the helmet body to extend above said lower edge, and at least one additional elongated reinforcement member having lower ends connected to said separate reinforcement member at opposite sides thereof and arching upwardly and encapsulated within said dome-shaped extent of the helmet, said members being formed from a material having a composition different from that of said body to reinforce said body, c) and locator means projecting on the member to locate it in the body of the helmet at the time of molding thereof.

21. In a method of constructing a helmet, the steps including:

a) forming a helmet body consisting of gas expanded synthetic resin, and having dome shape defining a lower edge extending in a loop, b) embedding a separate reinforcement member in the body, to project throughout its length proximate and above said lower edge, substantially entirely around the helmet body and between inner and outer walls defined by said body, and also embedding in said body at least one additional elongated reinforcement member having lower ends connected to said separate reinforcement member at opposite sides thereof and arching upwardly within said dome-shaped extent of the helmet, said members being formed from a material having a composition different from that of said body to reinforce said body, said embedding including molding said body about said separate member and about the entirety of said additional member.

22. The method of claim 21 including providing said separate reinforcement member to have band shape, and effecting said embedding to locate the separate reinforcement member width substantially parallel to the outer side for the helmet near its lower edge.

23. The method of claim 21 including employing lugs on said member to position it in a mold in which the body is molded.

24. The method of claim 21 including twisting said separate reinforcement member during molding of the body to position the separate reinforcement member in the body during molding thereof.

25. In a helmet, the combination comprising:

a) a helmet body consisting of gas expanded synthetic resin, and having dome shape defining a lower edge extending generally in a loop;

(b) reinforcement means encapsulated in the helmet body to extend above said lower edge, said reinforcement means including;

(i) a looping section comprising at least one discrete elongated reinforcement member encapsulated in the helmet body proximate the lower edge of the helmet body to extend in a loop substantially entirely around said helmet body, through a predetermined, limited height thereof, (ii) at least one arch-shaped section extending upwardly of and across the upper dome-shaped extent of the body from one side thereof to the other, each said arched-shaped section comprising at least one discrete elongate reinforcement member encapsulated in the dome-shaped extent of said body through a predetermined, limited arch length thereof.

26. The combination of claim 25 wherein each said reinforcement member of said looping section has a band shape, each said reinforcement member of said looping section being oriented to have a lower edge projecting towards the lower edge of the helmet body.

27. The combination of claim 26, wherein the looping section is formed from a single reinforcement member in the form of a ring which consists of high strength synthetic resin.

28. The combination of claim 25, including locator means projecting from each reinforcement member of said looping section to locate it in the body of the helmet at the time of molding thereof.

29. The combination of claim 25, wherein each said reinforcement member of each said arched-shaped section is curved to project along the dome-shaped extent defined by the helmet body.

30. The combination of claim 26, wherein each said reinforcement member of each said arched-shaped section has a portion that is embedded in the dome-shaped extent defined by the helmet body.

31. The combination of claim 25, wherein said helmet body has forwardly and rearwardly extending ridge portions which are sidewardly spaced apart, a said arch-shaped section extending into at least two of said ridge portions.

32. The combination of claim 31 wherein a said arched-shaped section extends through at least two of said ridge portions, crosswise thereof.

33. The combination of claim 25, wherein there are at least two of said arch-shaped sections which are arch shaped to extend within the helmet body upper dome-shaped extent, said arch-shaped sections having lower ends attached to said looping section.

34. The combination of claim 25, wherein each said reinforcement member consists of one or both of the following:

(i) NYLON (ii) KEEL

35. In the method of constructing a helmet, the steps including:

a) forming a helmet body consisting of gas expanded synthetic resin, and having dome shape defining a lower edge extending in a loop, b) providing a looping section comprising at least one discrete reinforcement member, and encapsulating each said member in the body, proximate said lower edge of the helmet body to extend in a loop substantially entirely around said helmet body, through a predetermined, limited height thereof, and c) providing at least one arch-shaped section, each said arch-shaped section comprising at least one discrete elongate reinforcement member, and encapsulating each said member in the helmet body to arch across the dome-shaped extent of the helmet body between opposite sides of the helmet body.

36. The method of claim 35, including providing each said member of said looping section to extend substantially parallel to the outer side of the helmet near its lower edge.

37. In the method of constructing a helmet, the steps including:
  a) forming a helmet body consisting of gas expanded synthetic resin, and having dome shape defining a lower edge extending in a loop,
  b) and embedding a looping section comprising at least one discrete reinforcement member in the body proximate said lower edge of the helmet body to extend a loop substantially entirely around said helmet body, through a predetermined, limited height thereof,
  c) and including providing at least one lug on each said member to position it in a mold in which the body is molded.

38. In the method of constructing a helmet, the steps including:
  a) forming a helmet body consisting of gas expanded synthetic resin, and having dome shape defining a lower edge extending in a loop,
  b) and embedding a looping section comprising at least one discrete reinforcement member in the body proximate said lower edge of the helmet body to extend in a loop substantially entirely around said helmet body, through a predetermined, limited height thereof,
  c) and including twisting each said member during molding of the body to position the member in the body during molding thereof.

39. In a helmet, the combination comprising:
  a) a helmet body consisting of gas expanded synthetic resin, and having dome shape defining a lower edge extending generally in a loop, and
  b) a looping section comprising at least one discrete elongated reinforcement member embedded in the helmet body above said lower edge of the helmet body to extend in a loop substantially entirely around said helmet body, through a predetermined, limited height thereof,
  c) each said member having band shape and being oriented to have a lower edge projecting toward the helmet lower edge.

40. In a helmet, the combination comprising:
  a) a helmet body consisting of gas expanded synthetic resin, and having dome shape defining a lower edge extending generally in a loop,
  b) reinforcement means embedded in the helmet body to extend above said lower edge,
  c) said reinforcement means including
    (i) a looping section comprising at least one discrete elongated reinforcement member encapsulated in the helmet body proximate the lower edge of the helmet body to extend in a loop substantially entirely around said helmet body through a predetermined limited height thereof,
    (ii) at least one arch-shaped section extending upwardly of and across the upper dome-shaped extent of the body from one side thereof to the other, each said arch-shaped section comprising at least one discrete elongate reinforcement member encapsulated in the dome-shaped extent of said body through a predetermined, limited arch length thereof,
  d) said arch-shaped section having lower ends attached to tabs anchored to said looping section.

41. The combination of claim 40 including an auxiliary web anchored to two laterally spaced ribs defined by the helmet body, and extending there between to resist relative spreading of such ribs.

42. In a helmet, the combination comprising:
  a) a helmet body consisting of gas expanded synthetic resin, and having dome shape defining a lower edge extending generally in a loop,
  b) an elongated reinforcement member embedded in the helmet body to extend above said lower edge,
  c) said reinforcement member including
    (i) a looping section encapsulated in the helmet proximate the helmet lower edge,
    (ii) at least one additional arch-shaped section extending upwardly into upper dome-shaped extent of the body, and encapsulated therein, and said additional section having lower ends attached to said looping section,
  d) and including tabs on said additional section to anchor said section in the helmet body which is molded about said tabs.

* * * * *